Patented Mar. 9, 1954

2,671,730

UNITED STATES PATENT OFFICE 2,671,730

COMPOSITION FOR WHIPPED EGG WHITE

Thomas P. Finucane, New Vernon, and William A. Mitchell, Lincoln Park, N. J., assignors to General Foods Corporation, New York, N. Y., a corporation of Delaware No Drawing. Application February 7, 1952, Serial No. 270,518

16 Claims. (Cl. 99—113)

The present invention relates to the improvement of the whipping qualities of reconstituted dried egg white, particularly to products incorporating whipped reconstituted dried egg white and more particularly to dry mixes for use in preparing products such as bakery products employing whipped reconstituted dried egg white.

An object of the invention is to improve the whipping qualities of reconstituted dried egg white.

Another object is to improve the quality of products using whipped reconstituted dried egg white, particularly bakery products including cakes of the sponge and angel food type.

A further object is to provide an improved dry mix for use in making products calling for whipped egg white, particularly bakery products including cakes of the sponge and angel food type.

A still further object is to provide an improved process for whipping reconstituted dried egg white, particularly in connection with the preparation of products requiring the same including cakes of the sponge and angel food type.

Other objects will be apparent from the discussion that follows hereinafter.

Because of the somewhat drastic treatment involved in the preparation of dried egg white difficulty is experienced in whipping the reconstituted egg material. The ease of whipping and the qualities and characteristics of the whip in the case of the reconstituted dried egg white are inferior as compared with fresh egg white. This presents a problem in attempting to market dry mixes, particularly complete dry mixes for use in the preparation of products including bakery products such as sponge cakes and angel food cakes.

It has now been found that the whipping characteristics and qualities of reconstituted dried egg white are greatly improved by providing for the presence of an alkali metal hexametaphosphate during the whipping procedure. The reconstituted dried egg white is not only more readily and easily whipped but improvements are effected with respect to various qualities of the whip such as its strength, stability, texture and ability to hold flour, sucrose and like materials which are folded into the whip in the course of preparing cakes such as sponge and angel food cake. The improvements thus effected with respect to the whipped reconstituted dried egg white are particularly advantageous in connection with the marketing of dry mixes for use in the preparation of products including bakery products, particularly complete dry mixes for use in the preparation of cakes such as sponge and angel food cakes.

The hexametaphosphates that may be employed in accordance with the present invention include those of sodium, potassium, lithium, rubidium, cesium and ammonium. The ammonium radical is for many purposes classified with the alkali metals and is also so classified for the present purpose. The hexametaphosphates of lithium, rubidium and cesium, while operative in the present invention, are not commercially available for the most part. The hexametaphosphates are of somewhat uncertain composition and various formulas have been proposed for them; sodium hexametaphosphate, for example, has been indicated to be $Na_6P_6O_{18}$, $Na_6(PO_3)_6$ and a mixture of $Na_5[Na(PO_3)_6]$, $Na_4[Na_2(PO_3)_6]$ and $Na_6(PO_3)_6$.

It has also been suggested that the hexametaphosphate occurs in the bis and tris forms. Some hexametaphosphates on the market are prepared in such a manner that other materials are provided in admixture with the hexametaphosphate. For example, one of the commercially available sodium hexametaphosphates is prepared with an excess of sodium carbonate so that solutions of the final product have a higher pH than is obtained with pure sodium hexametaphosphate. Such variations are for the most part usable and are intended to be included within the scope of the present invention.

The alkali metal hexametaphosphates are prepared for the most part by heating orthophosphates, metaphosphates, or pyrophosphates to a temperature of about 700° C. Suitable phosphates for this purpose are sodium diammonium phosphate, sodium hydrogen ammonium phosphate, sodium dihydrogen phosphate, disodium dihydrogen pyrophosphate and trisodium trimetaphosphate. Mixtures of phosphoric acid and sodium carbonate or sodium hydroxide may also be employed. In carrying out the fusion the object is to heat the material well above 600° C., this temperature being the transition temperature at which the trimetaphosphate is converted to the hexametaphosphate, and thereafter rapidly cooling the hexametaphosphate below 500° C. Between 500°–600° C. the hexametaphosphate gradually changes back to the trimetaphosphate.

The amount of hexametaphosphate that should be employed in whipping reconstituted dried egg white in accordance with the present invention may be varied over a wide range, the controlling factors being that if too small an amount is employed the improvement is not sufficient for most purposes whereas if an excessive amount is employed the cost is unnecessarily increased. Moreover, the result can even be the introduction of a slight off-flavor. In some cases, particularly when the present invention is employed in connection with the preparation of an angel food cake, it has been observed that the use of a sodium hexametaphosphate in an amount equal to about 15% of the weight of the dried egg white results in the cake having a very slight pink color. Generally, a sodium hexametaphosphate is employed in amounts equal to 1–15% of the weight of the dried egg white. It is preferred to employ a sodium hexametaphosphate in an amount equal to about 2½% of the weight of the dried egg white. Other alkali metal hexametaphosphates such as those of potassium, ammonium and the like may be employed in similar amounts, due consideration being given to variations caused by the different molecular weights of the materials.

While the improvement provided by the use of an alkali metal hexametaphosphate is effected at any pH normally found with reconstituted dried egg white, it has been found that optimum results are provided if the pH of the reconstituted dried egg white at the time of whipping is within the range of about 5.0–8.0. The pH of reconstituted dried egg white depends for the most part upon the treatment to which the egg material has been subjected in the course of processing. All commercially available dried egg white is prepared by first desugarizing the egg material by various methods such as by the action of microorganisms, yeasts and enzymes, and then drying it by spray drying, drum drying, tray drying, freeze drying or the like. Also, the egg white may be whipped or otherwise fluffed prior to being subjected to the drying treatment. In view of these variations it is sometimes necessary to employ a pH adjusting material to provide a pH within the range of 5.0–8.0 when the egg white is reconstituted with water. This is particularly necessary to provide a pH of 7.0, the optimum pH for whipping the reconstituted dried egg white in most cases. Such pH adjusting materials include cream of tartar, citric acid, monocalcium phosphate, sodium bicarbonate, sodium carbonate and the like.

It is well known that the incorporation of sucrose in egg white materially aids its being whipped and, moreover, provides a whip of superior texture and quality for many purposes. Similar considerations hold in connection with practice of the present invention. Generally, it is preferred that the amount of sucrose employed be somewhere between 1 and 2 times the weight of the dried egg white, the preferred amount being of the order of 1½ times the amount of the dried egg white. The use of sucrose in this manner provides a whip which is more satisfactory from the standpoint of subsequently folding in the other ingredients which are involved in preparing cakes such as sponge and angel food cakes. In many cases it is desired that the cake or other bakery product contain more sucrose than the amount mentioned above. In such a case the sucrose can best be folded in after the whip has been prepared and along with folding in other ingredients such as flour, salt, cream of tartar and the like.

It has been found as a general matter that in the preparation of a cake the pH of the same should be carefully considered and controlled, for example, by the addition of an appropriate amount of an acidic pH adjusting material such as cream of tartar mentioned above. The pH of a cake should be within the range of about 4.5–7.0, preferably 5.4–5.9. The pH of a cake is generally determined in accordance with the method of the Association of Official Agricultural Chemists. The method is essentially as follows: A representative slice of the cake is cut and the outside crust is trimmed off. The slice is crumbled and 10 g. of the crumbs are placed in 100 cc. of distilled water, stirred to break up, allowed to stand for ½ hr. and filtered. The pH of the filtrate is determined and it is referred to as the pH of the cake or, sometimes, as the "crumb pH."

The following examples are provided for the purpose of illustrating the present invention with greater particularity, but the invention is not to be restricted to the details set forth and reference should be had to the appended claims for a definition of the limits of the invention:

*Example I*

A mixture containing 38 g. of dried egg white, 1.0 g. of sodium hexametaphosphate and 0.03 g. of cream of tartar is placed in 270 cc. of water, the resulting pH being 7.0. Whipping is begun and after a period of about 2 min. a whip capable of forming "stiff peaks" is obtained. This material may be employed in whatever manner is desired, for example, in the preparation of a meringue, a pudding or a cake of the sponge or angel food type.

If an angel food cake is desired there can be folded into the whipped egg white prepared as above 90 g. of flour, preferably a cake or patent flour, 265 g. of sucrose, 1.0 g. of salt and 1.6 g. of cream of tartar to prepare an adequate amount of an angel food batter to be baked in a 10 in. tin at 375° F. for ½ hr. and provide an angel food cake about 4 in. high.

When it is intended to whip egg white in the preparation of an angel food cake in the manner described above, it is preferred that a certain amount of the sucrose be present in the reconstituted dried egg white at the time of whipping. This facilitates the whipping action and, moreover, provides a whip having better qualities such as texture, stability and the like for folding in the other ingredients and otherwise preparing the cake.

*Example II*

A complete dry mix which may be used in the preparation of an angel food cake, needing only the addition of water, can be prepared by combining 30–50 g., preferably 38 g., of dried egg white, 50–80 g., preferably 63 g., of sucrose, 0.5–1.5 g., preferably 1.0 g., of sodium hexametaphosphate and 0.001–0.500 g., preferably 0.03 g., of cream of tartar in one separately packaged mixture, said package being preferably contained within a larger carton or package which also contains a second mixture comprising 80–100 g., preferably 90 g., of cake flour, 150–250 g., preferably 202 g., of sucrose, salt to taste (usually about 1 g.) and 0.001–3.800 g., preferably 1.6 g., of cream of tartar.

The contents of the first package, the dried egg white, sucrose, hexametaphosphate and cream of tartar, are combined with 270 cc. of water, the pH of the resulting solution being about 7.0, and whipped for about 2 min. to provide a whip having stiff peaks. The remaining ingredients or the mixture comprising cake flour, sucrose, salt and cream of tartar are then folded into the whipped egg white. The folding-in process is preferably done by dividing the second mixture into 4 equal parts, sifting and folding in one portion at a time.

The batter thus prepared is transferred to a 10 in. angel food cake tin and baked for ½ hr. at an oven temperature of 375° F. to provide a cake having a height of 4 in. or more.

To prepare an angel food cake of this size requires the whites of 10 to 13 eggs with all of the attendant difficulties of separating the yolks and whites and being required to find a use may be put.

What is claimed is:

1. A composition for the preparation of whipped egg white by the addition of water and beating, which comprises a dry mixture of dried egg white and a dry whipping aid in the form of an alkali metal hexametaphosphate.

2. A composition as defined in claim 1, said whipping aid comprising sodium hexametaphosphate.

3. A composition as defined in claim 1, together with a pH adjusting material in a quantity that provides a pH in the range of 5.0 to 8.0 when the composition is dissolved in water.

4. A composition as defined in claim 1, said whipping aid comprising sodium hexametaphosphate in the amount of about 2½% of the weight of the dried egg white.

5. A process for improving the whipping qualities of re-constituted dried egg white which comprises adding to the dried egg white a whipping aid in the form of a dry alkali metal hexametaphosphate.

6. A process as defined in claim 5, wherein said whipping aid comprises sodium hexametaphosphate.

7. A process as defined in claim 5, wherein a pH adjusting material is added to the egg white in a quantity that provides a pH in the range of 5.0 to 8.0 when the egg white is dissolved in water.

8. A process as defined in claim 5, wherein said whipping aid comprises sodium hexametaphosphate in the amount of about 2½% of the weight of the dried egg white.

9. In a process of whipping re-constituted dried egg white, the improvement comprising admixing an alkali hexametaphosphate with said egg white prior to whipping.

10. A process as defined in claim 9, wherein sodium hexametaphosphate is admixed with said egg white.

11. A process as defined in claim 9, wherein a pH adjusting material is admixed with the egg white in a quantity that provides a pH in the range of 5.0 to 8.0 when the egg white is dissolved in water.

12. A process as defined in claim 9, wherein sodium hexametaphosphate in the amount of 2½% by weight of the dried egg white is admixed with said dried egg white.

13. A process for making a cake of the sponge and angel food type from a dry packaged cake mix which comprises dissolving a dry mixture of dried egg white and alkali metal hexametaphosphate in water to re-constitute said egg white and then whipping the same to form a stiff whip, folding into the whip a second separate dry mixture of cake-making ingredients including flour and sugar, and baking the resultant cake batter.

14. The process defined in claim 13 wherein said alkali metal hexametaphosphate comprises sodium hexametaphosphate.

15. The process defined in claim 13 wherein said first dry mixture includes a pH adjusting material in a quantity that provides a pH in the range of 5.0 to 8.0 when said dry mixture is dissolved in water.

16. The process defined in claim 13 wherein said first dry mixture comprises sodium hexametaphosphate in the amount of 2½% by weight of the dried egg white.

THOMAS P. FINUCANE.
WILLIAM A. MITCHELL.

References Cited in the file of this patent

UNITED STATES PATENTS

| Number | Name | Date |
| --- | --- | --- |
| 1,076,227 | Prevost | Oct. 21, 1913 |
| 2,305,263 | Latshaw | Dec. 15, 1942 |
| 2,445,879 | Hall | July 27, 1948 |

FOREIGN PATENTS

| Number | Country | Date |
| --- | --- | --- |
| 154,257 | Great Britain | Nov. 26, 1920 |

OTHER REFERENCES

Dawson: Food Research, July–August 1947, pages 288–9.

Science News Letter for July 14, 1951, page 19.

Lowe: Experimental Cookery, 2nd ed., 1937, Wiley, pages 348, 362, 363, 372.

Certificate of Correction

Patent No. 2,671,730      March 9, 1954

Thomas P. Finucane et al.

It is hereby certified that error appears in the printed specification of the above numbered patent requiring correction as follows:

Column 5, line 10, after "use" insert *to which the yolks*;

and that the said Letters Patent should be read as corrected above, so that the same may conform to the record of the case in the Patent Office.

Signed and sealed this 27th day of April, A. D. 1954.

[SEAL]

ARTHUR W. CROCKER.

mixture into 4 equal parts, sifting and folding in one portion at a time.

The batter thus prepared is transferred to a 10 in. angel food cake tin and baked for ½ hr. at an oven temperature of 375° F. to provide a cake having a height of 4 in. or more.

To prepare an angel food cake of this size requires the whites of 10 to 13 eggs with all of the attendant difficulties of separating the yolks and whites and being required to find a use may be put.

What is claimed is:

1. A composition for the preparation of whipped egg white by the addition of water and beating, which comprises a dry mixture of dried egg white and a dry whipping aid in the form of an alkali metal hexametaphosphate.

2. A composition as defined in claim 1, said whipping aid comprising sodium hexametaphosphate.

3. A composition as defined in claim 1, together with a pH adjusting material in a quantity that provides a pH in the range of 5.0 to 8.0 when the composition is dissolved in water.

4. A composition as defined in claim 1, said whipping aid comprising sodium hexametaphosphate in the amount of about 2½% of the weight of the dried egg white.

5. A process for improving the whipping qualities of re-constituted dried egg white which comprises adding to the dried egg white a whipping aid in the form of a dry alkali metal hexametaphosphate.

6. A process as defined in claim 5, wherein said whipping aid comprises sodium hexametaphosphate.

7. A process as defined in claim 5, wherein a pH adjusting material is added to the egg white in a quantity that provides a pH in the range of 5.0 to 8.0 when the egg white is dissolved in water.

8. A process as defined in claim 5, wherein said whipping aid comprises sodium hexametaphosphate in the amount of about 2½% of the weight of the dried egg white.

9. In a process of whipping re-constituted dried egg white, the improvement comprising admixing an alkali hexametaphosphate with said egg white prior to whipping.

10. A process as defined in claim 9, wherein sodium hexametaphosphate is admixed with said egg white.

11. A process as defined in claim 9, wherein a pH adjusting material is admixed with the egg white in a quantity that provides a pH in the range of 5.0 to 8.0 when the egg white is dissolved in water.

12. A process as defined in claim 9, wherein sodium hexametaphosphate in the amount of 2½% by weight of the dried egg white is admixed with said dried egg white.

13. A process for making a cake of the sponge and angel food type from a dry packaged cake mix which comprises dissolving a dry mixture of dried egg white and alkali metal hexametaphosphate in water to re-constitute said egg white and then whipping the same to form a stiff whip, folding into the whip a second separate dry mixture of cake-making ingredients including flour and sugar, and baking the resultant cake batter.

14. The process defined in claim 13 wherein said alkali metal hexametaphosphate comprises sodium hexametaphosphate.

15. The process defined in claim 13 wherein said first dry mixture includes a pH adjusting material in a quantity that provides a pH in the range of 5.0 to 8.0 when said dry mixture is dissolved in water.

16. The process defined in claim 13 wherein said first dry mixture comprises sodium hexametaphosphate in the amount of 2½% by weight of the dried egg white.

THOMAS P. FINUCANE.
WILLIAM A. MITCHELL.

References Cited in the file of this patent

UNITED STATES PATENTS

| Number | Name | Date |
|---|---|---|
| 1,076,227 | Prevost | Oct. 21, 1913 |
| 2,305,263 | Latshaw | Dec. 15, 1942 |
| 2,445,879 | Hall | July 27, 1948 |

FOREIGN PATENTS

| Number | Country | Date |
|---|---|---|
| 154,257 | Great Britain | Nov. 26, 1920 |

OTHER REFERENCES

Dawson: Food Research, July–August 1947, pages 288–9.

Science News Letter for July 14, 1951, page 19.

Lowe: Experimental Cookery, 2nd ed., 1937, Wiley, pages 348, 362, 363, 372.

Certificate of Correction

Patent No. 2,671,730 — March 9, 1954

Thomas P. Finucane et al.

It is hereby certified that error appears in the printed specification of the above numbered patent requiring correction as follows:

Column 5, line 10, after "use" insert *to which the yolks*;

and that the said Letters Patent should be read as corrected above, so that the same may conform to the record of the case in the Patent Office.

Signed and sealed this 27th day of April, A. D. 1954.

[SEAL]

ARTHUR W. CROCKER.

Certificate of Correction

Patent No. 2,671,730 March 9, 1954

Thomas P. Finucane et al.

It is hereby certified that error appears in the printed specification of the above numbered patent requiring correction as follows:

Column 5, line 10, after "use" insert *to which the yolks*;

and that the said Letters Patent should be read as corrected above, so that the same may conform to the record of the case in the Patent Office.

Signed and sealed this 27th day of April, A. D. 1954.

[SEAL]

ARTHUR W. CROCKER.